7637X
E. Nott.
Refining Iron & Steel.
Patented Jun. 29, 1833.
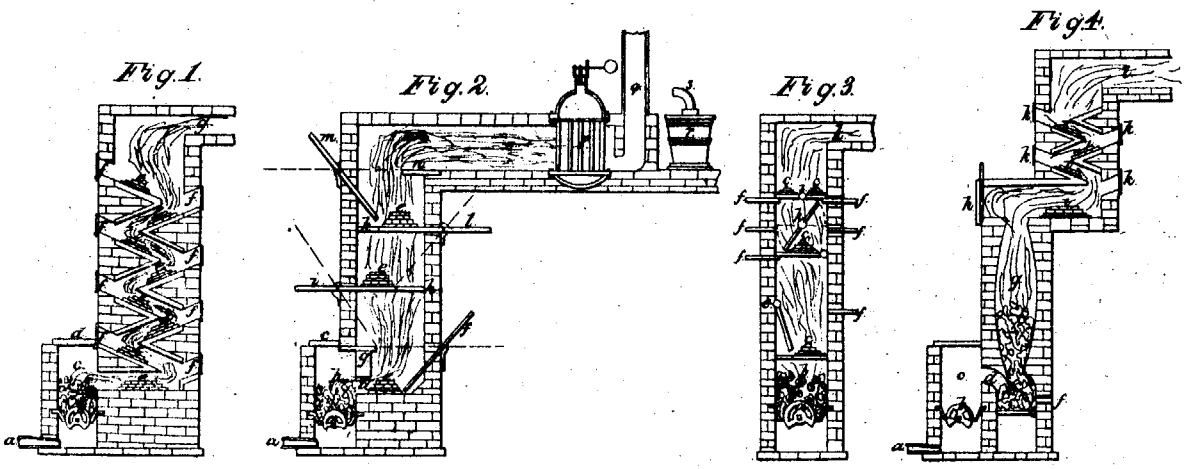

7637X June 29. 1833 225

Case "3."

Eliphalet Nott

Letters Patent

The schedule referred to in these Letters Patent and making
part of the same, containing a description in the words of the said
Eliphalet Nott, himself of his improvement in the construction of
the vertical grate & in the manner of combining therewith the
sash for mica & the inlet for fuel in an anthracite coal stove.

---

Case No. 3. —

Specification of an improvement made in the constructing
the vertical grate & in the manner of combining therewith the sash
containing mica, or other lamina for illuminating the front of an
anthracite coal stove having its inlet for fuel at top.
Whereas inconvenience has arisen from the falling out of ashes on
opening the illuminating sash in front when hung as usual at
the side or top; & also from the warping of a fixed front grate &
especially when of considerable horizontal extent. Therefore
certain improvements, perfected & tested by repeated experiments
are now intended to be introduced into general use; which im=
provement consists. In making use (in place of one entire fixed
grate) of a grate composed of two or more vertical sections of about
four or five inches each, in horizontal extent; whenever the central
opening in the front, to be occupied thereby is large enough to
admit of more than one such section in which case said sections
arranged edge to edge at small distances from each other in the same
vertical plane, are to be combined in the central opening of the front
with a sash for illuminating the same in such manner that said
grate, whether consisting of one or more sections, shall occupy the
interior position, be hung at top & open inward & that said [illegible] shall
shall occupy the exterior position be hung at bottom & open outward,
and that space shall be left between the two of about one inch,
for

6

[illegible] 76377 for the ascent of air, & the descent of ashes which may be effected by casting interior sockets on the front plate at the upper margin of its central opening & exterior sockets at the lower margin of the same; the former for receiving corresponding gudgeons cast on the upper margin of the grate and the latter those on the under margin of the sash.— for further information reference must be had to the drawings & explanations hereunto appended.

<u>Summary</u>

The improvement above contemplated consists: In preventing in Anthracite coal stoves having their inlet for fuel at top, the falling out of ashes & the warping of the front grate, by dividing the same vertically into sections of four or five inches each more or less in horizontal extent, when the space to be occupied is sufficiently large to admit of such divisions; & by combining the same whether so divided into sections or not, with its illuminating sash in the central opening of the front, in such manner that said grate shall occupy the interior position, be hung at top, & swing inward; said sash occupy the exterior position, be hung at the bottom, & open outward and that when shut a space of about an inch shall be left between the two for the ascent of air & the descent of ashes.

I therefore claim as my invention & improvement in Anthracite coal stoves having their inlet for fuel at top, the preventing of the falling out of ashes, & the warping of the front grate by dividing the same vertically into sections, as aforesaid, & whether so divided or not by combining the same with its illuminating sash in front in the manner above set forth, together with the uses to which said improvement has been or may hereafter be applied irrespective of the inlet for fuel at top, & irrespective of every other provision with which the same may be combined in stove or furnaces of any sort.

[illegible]

[illegible] Witnesses

G. F. Yates

D. Boyd

Eliphalet Nott

[illegible]

[illegible]

(Granted June 29. 1833)

(Dr in portfolio)